United States Patent
Kudo et al.

(10) Patent No.: US 8,169,627 B2
(45) Date of Patent: May 1, 2012

(54) IMAGE OUTPUTTING SYSTEM

(75) Inventors: Tomoo Kudo, Koganei (JP); Chiharu Kobayashi, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1184 days.

(21) Appl. No.: 11/376,010

(22) Filed: Mar. 15, 2006

(65) Prior Publication Data

US 2007/0019230 A1  Jan. 25, 2007

(30) Foreign Application Priority Data

Jul. 22, 2005  (JP) ................. 2005-213086

(51) Int. Cl.
*G06F 3/12* (2006.01)
*G06K 15/00* (2006.01)
*G06K 9/00* (2006.01)
*G06K 9/36* (2006.01)
*G06F 12/00* (2006.01)
*G06F 7/00* (2006.01)

(52) U.S. Cl. ............ 358/1.13; 358/1.14; 358/1.15; 382/100; 382/232; 707/758; 707/821

(58) Field of Classification Search ............ 358/1.13, 358/1.14, 1.15; 382/100, 232; 707/6, 102, 707/104.1

See application file for complete search history.

(56) References Cited

U.S. PATENT DOCUMENTS

| | | | | |
|---|---|---|---|---|
| 7,193,732 B2 * | 3/2007 | Yada | ............ | 358/1.1 |
| 7,548,916 B2 * | 6/2009 | Kaneda | ............ | 707/6 |
| 2004/0184043 A1 * | 9/2004 | Hirosugi et al. | ............ | 358/1.1 |
| 2006/0008114 A1 * | 1/2006 | Sekiguchi et al. | ............ | 382/100 |

FOREIGN PATENT DOCUMENTS

| | | |
|---|---|---|
| JP | 11-134147 | 5/1999 |
| JP | 2005-119095 A | 5/2002 |
| JP | 2002-127570 A | 5/2005 |

OTHER PUBLICATIONS

Japanese Office Action dated May 25, 2010 and English translation thereof, issued in counterpart Japanese Application No. 2005-213086.

* cited by examiner

*Primary Examiner* — King Poon
*Assistant Examiner* — Neil R McLean
(74) *Attorney, Agent, or Firm* — Holtz, Holtz, Goodman & Chick, PC

(57) ABSTRACT

There is described an image outputting system including a controlling apparatus and an image outputting apparatus. The image outputting apparatus is provided with an inputting unit to input a change instruction with respect to the print products and a setting-change instructing unit to transmit the change instruction to the controlling apparatus, when the change instruction, inputted from the inputting unit, includes a change of the setting information. The controlling apparatus is provided with a first changing unit to rewrite the setting information attached to the first-type image data being an object of the change instruction, based on the change instruction when receiving the change instruction and an image develop processing section to convert the first-type image data, being an object of the change instruction, to the second-type image data, based on the setting information rewritten, and to send the second-type image data to the image outputting apparatus.

6 Claims, 8 Drawing Sheets

FIG. 3
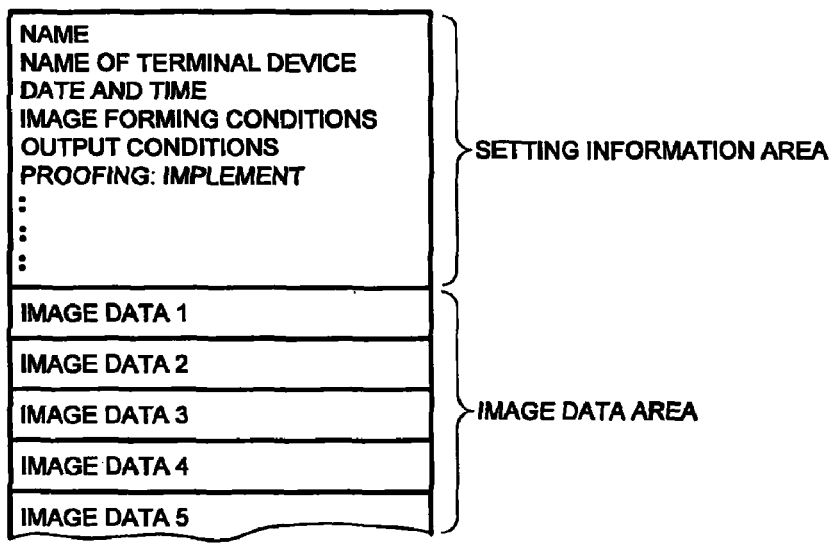
FIG. 4 (b)
RASTER DATA
FIG. 4 (c)
COMPARING WITH HALFTONE DOT FUNDAMENTAL DATA
FIG. 4 (d)
HALFTONE DOT IMAGE DATA
FIG. 4 (a)
RASTER DATA
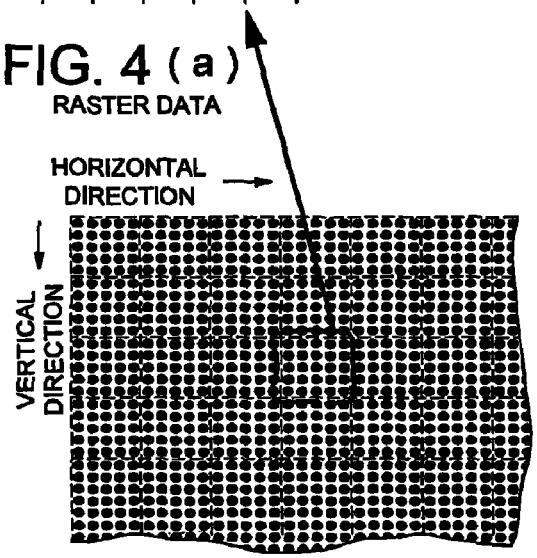
FIG. 4 (e)
HALFTONE DOT IMAGE DATA
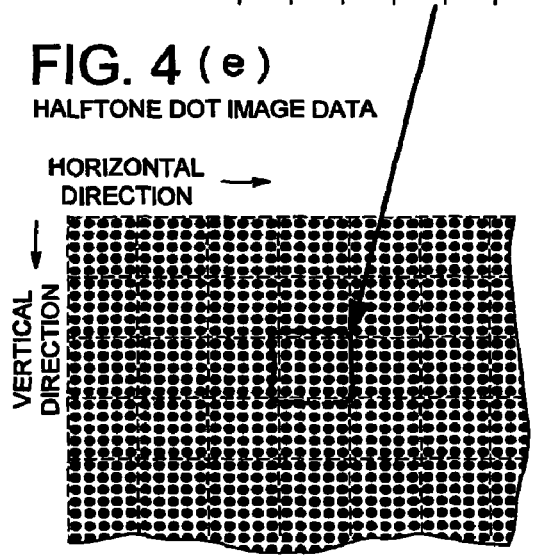

IMAGE OUTPUTTING SYSTEM

This application is based on Japanese Patent Application NO. 2005-213086 filed on Jul. 22, 2005 in Japanese Patent Office, the entire content of which is hereby incorporated by reference.

BACKGROUND OF THE INVENTION

The present invention relates to an image outputting system, which includes an image outputting apparatus and a controlling apparatus, which is coupled to the image outputting apparatus so as to develop first-type image data into second-type image data serving as an output possible format in the image outputting apparatus and sends the second-format image data to the image outputting apparatus.

In recent years, the image outputting apparatus, such as, for instance, a color laser printer employing an electro-photographic method, a compound apparatus having functions of a color laser printer, a scanner, a copier, a facsimile, etc. (hereinafter, referred to as a color laser printer as a whole), has been improved in its capability of producing a high quality image, and further, in its capability of speedily outputting a high quality color image without increasing its cost. Further, various kinds of finishers to be coupled to the color laser printer have been devised, and as a result, it becomes possible for the color laser printer to create and output printed products in such a output manner that various kinds of processing, such as a stapling, etc., are applied to the printed products. Reflecting such the recent trends, the color laser printer has been employed for the outputting use of final printed products, for instance, in a small-lot printing field, etc.

On the other hand, according to the proliferation of the DTP (Desk Top Publishing), etc., the image data are created on a client terminal, serving as an external terminal device including a personal computer, etc., by conducting an editing operation to be executed on the imaging software. Such the image data are to be elements of the image forming operation (hereinafter, referred to as elementary data) and includes vector data (the first-type image data) and raster data (the second-type image data). The vector data are called vector graphics, which represent each of objects as the image shown in FIG. 11 by using an aggregation of depicting information including coordinates of points and parameters for equations of lines and surfaces coupling objects to each other, painting colors (in FIG. 2, represented by the gradation values of dot percent for each of YMCK colors), special effects, font information representing a shape of character and its size, etc. While, the raster data are called bitmap graphics, in which one raster line is constituted by a plurality of pixels arrayed at predetermined intervals (resolution) in a horizontal direction, and further, a plurality of raster lines are also arranged at predetermined intervals in a vertical direction, and each of pixels is represented by using depicting information represented by gradation values. Further, the setting information including the first predetermined conditions, such as, for instance, image forming conditions with respect to the color adjustment, the layout such as allotment of the images, etc., the second predetermined conditions, such as, for instance, outputting conditions with respect to the output mode, such as a proofing, a stapling, a folding, etc., and the number of output copies, and a name, a name of terminal device, date-and-time information as an attribute information, are attached to the elementary data.

Then, the outputting operation of the printing products is conducted on the basis of the elementary data. Concretely speaking, at first, the controlling apparatus coupled to the color laser printer receives the elementary data and the setting information from the terminal device through the network, and then, applies the color adjustment processing and the allotment processing to the elementary data so as to develop (convert) them into the printing data serving as image data having an output possible format for the color laser printer (the second-type image data), namely, for instance, halftone dot image data in which dots are formed within a predetermined area as shown in FIG. 13 (pixels in 5×5 area in the drawing) so as to express light and shade. according to the area of the dots. In other words, the elementary data are converted to the halftone dot image data, based on the first predetermined conditions indicated in the setting information. Then, the color laser printer conducts the image forming operation of the halftone dot image data based on the second predetermined conditions to output the printing products.

Incidentally, when conducting the abovementioned image outputting operation, to illuminate the waste of printing products due to a certain defect generated in the printed contents, such as, for instance, a color defect, etc., which is found after print outputting operations of plural copies are completed, there has been a function of "proofing" in which only one copy to be used for confirmation of the printed contents is printed. According to the proofing, it becomes possible to reduce the waste of printing products, since only one copy is outputted from the color laser printer in order to confirm the contents of the printed copy and then a plurality of copies are outputted from the color laser printer.

As a result of the proofing, however, sometimes, it becomes necessary to change the image forming conditions with respect to the color adjustment, the layout such as allotment of the images, etc., serving as the first predetermined conditions in regard to the developing operation. It is impossible, however, for the operator to directly modify the halftone dot image data in order to cope with the abovementioned changing operation. Accordingly, to cope with such the changing operation, the operator had to stop the outputting operation based on the halftone dot image data concerned, and had to move from the place where the color laser printer is installed to the place where the terminal device is installed, in order to conduct the operation for changing the image forming conditions, the operation for adding the changed image forming conditions to the elementary data, and the operation for sending the elementary data added with the changed image forming conditions to the controlling apparatus, at the terminal device, and then, had to again conduct the developing operation mentioned in the above at the controlling apparatus. As described in the above, according to the conventional method, it had taken much time and labor to change the image forming conditions.

Further, as a function of the proofing, for instance, Patent Document 1 sets forth the feature for conducting proofing operations with respect to all of the printing modes so as to make it possible to select a preferable printed result from them. However, this feature requires the developing operations and outputting operations in regard to all of the printing modes, resulting in a large amount of waste of time and expendable supplies.

[Patent Document 1]
Tokkaihei 11-134147 (Japanese Non-Examined Patent Publication)

SUMMARY OF THE INVENTION

So there is a need to provide image outputting system, which makes it possible to issue an instruction for changing setting information with respect to the developing operation included in the setting information attached to the first-type image data created by the external terminal device, and to easily obtain the print products corresponding to the instruction of the change.

Accordingly, present invention can be attained by image outputting systems described as follow.

(1) An image outputting system, has a controlling apparatus that receives first-type image data and setting information attached to said first-type image data; and an image outputting apparatus that is coupled to said controlling apparatus so that said controlling apparatus and said image outputting apparatus can communicate with each other through a network;

wherein said controlling apparatus is provided with a converting unit to convert said first-type image data to second-type image data, being processable for said image outputting apparatus, so as to send said second-type image data and said setting information to said image outputting apparatus; and wherein said image outputting apparatus is provided with an image outputting unit to output print products based on said second-type image data and said setting information received from said controlling apparatus, an inputting unit to input a change instruction with respect to said print products and a setting-change instructing unit to transmit said change instruction to said controlling apparatus, when said change instruction, inputted from said inputting unit, includes a change of said setting information; and wherein said controlling apparatus is further provided with a first changing unit to rewrite said setting information attached to said first-type image data being an object of said change instruction, based on said change instruction when receiving said change instruction; and wherein said converting-unit converts said first-type image data being an object of said change instruction, to said second-type image data, based on current setting information rewritten by said first changing unit, so as to send said second-type image data and said setting information to said image outputting apparatus.

(2) An image outputting system, has a controlling apparatus that receives first-type image data and setting information attached to said first-type image data; and an image outputting apparatus that is coupled to said controlling apparatus so that said controlling apparatus and said image outputting apparatus can communicate with each other through a network;

wherein said controlling apparatus is provided with a converting unit to convert said first-type image data to second-type image data, being processable for said image outputting apparatus, so as to send said second-type image data and said setting information to said image outputting apparatus; and wherein said image outputting apparatus is provided with an image outputting unit to output print products based on said second-type image data and said setting information received from said controlling apparatus, a controlling unit to control said image outputting unit so as to conduct a proof printing based on said second-type image data when an instruction for implementing a proofing is included in said setting information, an inputting unit to input a change instruction with respect to said print products and a setting-change instructing unit to-transmit said change instruction to said controlling apparatus, when an instruction for changing said setting information with respect to said proofing is inputted from said inputting unit and said change instruction, inputted from said inputting unit, includes a change of said setting information; and wherein said controlling apparatus is further provided with a first changing unit to rewrite said setting information attached to said first-type image data being an object of said change instruction, based on said change instruction when receiving said change instruction; and wherein said converting unit converts said first-type image data being an object of said change instruction, to said second-type image data, based on current setting information rewritten by said first changing unit, so as to send said second-type image data and said setting information to said image outputting apparatus.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 shows a structure of data including both image data and setting information;

FIG. 4(a), FIG. 4(b), FIG. 4(c), FIG. 4(d) and FIG. 4(e), are explanatory drawings for explaining processes for converting raster data to halftone dot image data by employing the halftone dot fundamental data;

DETAILED DESCRIPTION OF THE PREFERRED EMBODIMENT

Figure 1:
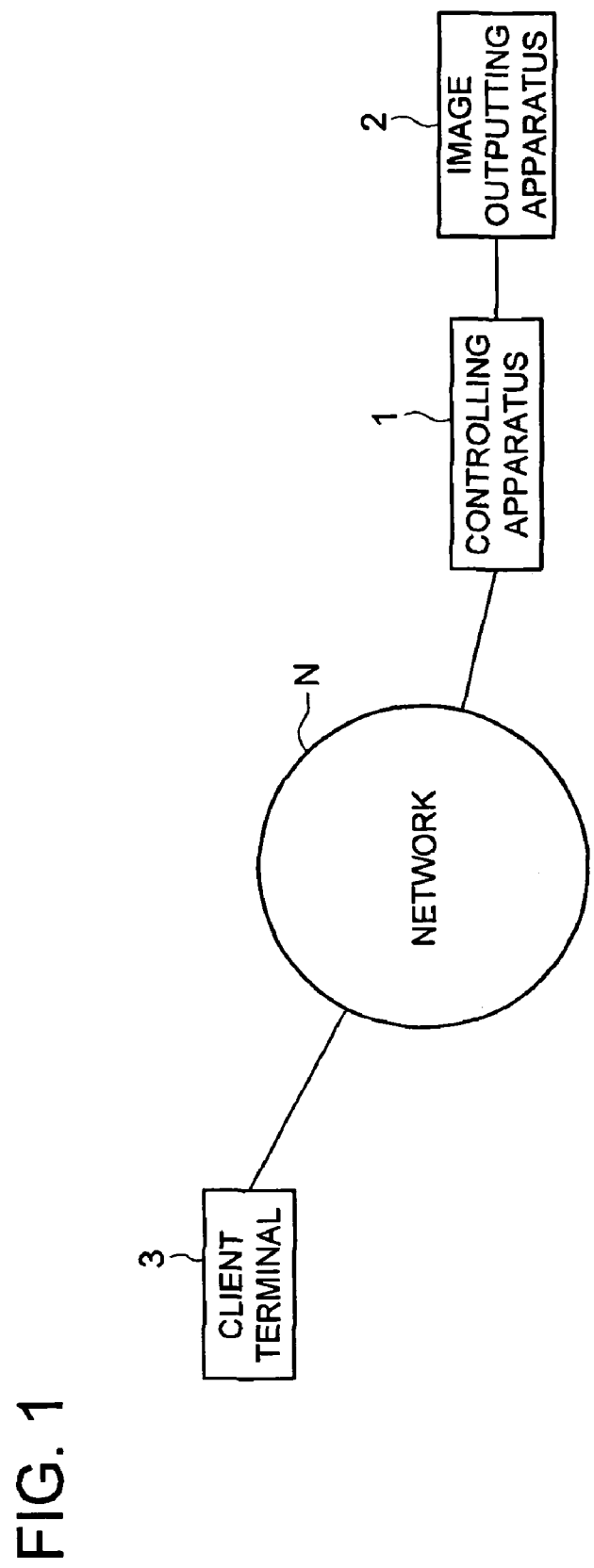
FIG. 1 shows a total configuration of an image outputting system embodied in the present invention.

In an image outputting system, which includes an image outputting apparatus and a controlling apparatus, which is coupled to the image outputting apparatus so as to develop first-type image data into second-type image data serving as an output possible format in the image outputting apparatus and sends the second-type image data to the image outputting apparatus, the image outputting system embodied in the present invention makes it possible to instruct a change of the first predetermined setting information (detailed later) with respect to the developing operation to be conducted in the image outputting apparatus, and makes it possible to conduct the image forming operation and the outputting operation under the instructed conditions.

Referring to the drawings, an embodiment of the image outputting system embodied in the present invention will be detailed in the following. Further, the elementary data and the print data described in the "BACKGROUND OF THE INVENTION" will be also detailed as examples of the vector data and the halftone dot image data in the following, respectively.

<System Configuration>

At first, referring to FIG. 1, the total configuration of the image outputting system embodied in the present invention will be detailed in the following. FIG. 1 shows the total configuration of the image outputting system embodied in the present invention.

As shown in FIG. 1, the image outputting system is constituted by a client terminal 3 serving as a working terminal station through which the operator conducts an image editing operation of the print products, an image outputting apparatus 2 for outputting an color image and a controlling apparatus 1 serving as a controller for conducting controlling operations with respect to the output control of the image outputting apparatus 2. Further, the client terminal 3 and the controlling apparatus 1 are coupled to each other in a transmittable manner through a network N, such as Internet, etc.

Either a wired coupling, such as an exclusive line and a public line, or a wireless coupling, such as through a communication satellite, etc., could be employed as the network N, which couples a computer system, a terminal device, a data communication installation with each other. In addition, the so-called Internet could be also employed as the network N.

The client terminal 3 serves as a so-called PC (Personal Computer), which is provided with a computer proper, a keyboard, a monitor, etc., and in addition, an image inputting device, such as an image scanner, etc. (not shown in the drawings). By operating the client terminal 3 in which the computer proper is provided with an application software, the application software is executed so as to create a PostScript (Registered Trade Mark) and elementary data written in the page description language. Further, the setting information, as described in the "BACKGROUND OF THE INVENTION", including the first predetermined setting information, such as, for instance, image forming conditions with respect to the color adjustment, the layout such as allotment of the images, etc., the second predetermined setting information, such as, for instance, outputting conditions with respect to the output mode, such as a shifting of an image position of a recording medium, a stapling, a folding, etc., and the number of output copies, and a name, a name of terminal device, date-and-time information as an attribute information, and the setting information with respect to the proofing are attached to the elementary data, and can be transmitted to the controlling apparatus 1 through the network N. FIG. 3 shows a structure of data to be transmitted. As shown in FIG. 3, the data to be transmitted includes a setting information section and an image data section. The abovementioned setting information are described (stored) in the setting information section, while the elementary data (image data in FIG. 3) are described (stored) for every page in the image data section. Further, it is also applicable that a plurality of such the client terminals are provided in the system.

The controlling apparatus 1 includes at least a computer proper into which a predetermined operational program is installed so as to work as a RIP (Raster Image Processor), and conducts the developing operation (conversion processing) of the elementary data by using the RIP function, and transmits the print image data acquired by the developing operation to the image outputting apparatus 2.

The image outputting apparatus 2 forms a color image by overlapping unicolor images of the primary colors, including color C (Cyan), color M (Magenta), color Y (Yellow) and color K (Black), and applies finish processing, including a stapling, etc., to printed products according to the outputting conditions, so as to output the finished print products.

Figure 2:
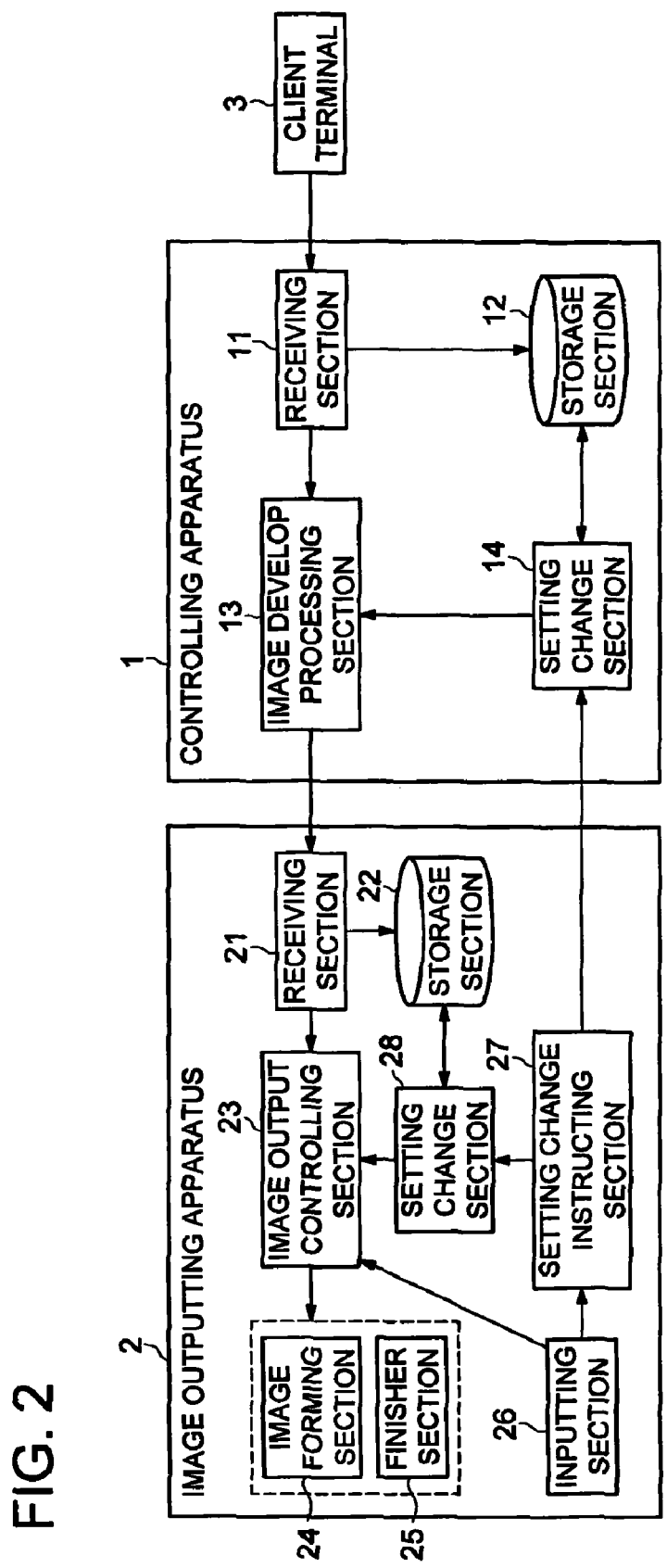
FIG. 2 shows a functional block diagram of a controlling apparatus and an image outputting apparatus embodied in the present invention.

Next, referring to FIG. 2, the controlling configuration of the controlling apparatus 1 and the image outputting apparatus 2 will be detailed in the following. FIG. 2 shows a functional block diagram of the controlling apparatus 1 and the image outputting apparatus 2.

<Controlling Configuration of Controlling Apparatus>

A receiving section 11 receives the elementary data and the setting information from the client terminal 3 through network N, and then, sends them to an image develop processing section 13, and at the same time, stores them into a storage section 12.

Based on the instruction of setting change sent from the image outputting apparatus 2, a setting change section 14 (serving as a first changing section) rewrites the setting information of the elementary data, being the object of the changing instruction and stored in the storage section 12, so as to send the rewritten setting information to the processing section 13.

The image develop processing section 13 has functions of a color adjustment processing section, a layout processing section, a rasterization processing section and a halftone dot conversion processing section. According to the functions mentioned in the above, the image develop processing section 13 conducts the color adjustment processing or the layout processing based on the image forming conditions, and applies the rasterization processing to the elementary data, and further, converts the rasterized data to the halftone dot image data, which are conducted as the developing operation for the elementary data. Then, the image develop processing section 13 transmits the halftone dot image data and the setting information to the image outputting apparatus 2.

As the general examples of the color adjustment conditions with respect to the color adjustment processing, the color adjustment conditions, indicated by the image forming conditions, include a foundation adjustment, a backside transfer preventing treatment, a read color adjustment, a green color adjustment, a blue color adjustment, a hue adjustment, a color saturation adjustment, a brightness adjustment, a sharpness adjustment, a contrast adjustment, a color balance adjustment, a kind of paper, a glossiness treatment, etc. The image develop processing section 13 changes the gradation values represented by the elementary data by employing a color profile, a gradation correction curve, etc., based on the color adjustment conditions indicated by the image forming conditions. Other than the above, a layout processing and a halftone dot conversion processing are also included in the image forming conditions.

Further, as the layout conditions with respect to the layout processing, the layout conditions include, for instance, a one side, both sides, an inter sheet, a chapter dividing, a page insertion, an overlay, 2 in 1, a booklet, image allotments such as a repeating, a seamless binding, etc., magnification of an image, a rotation of an image, etc. The image develop processing section 13 conducts the layout processing of the images represented by the elementary data so as to output the print products, which conform to the layout conditions, such as an allotting condition, a magnification and a direction, indicated by the image forming conditions.

Figure 11:
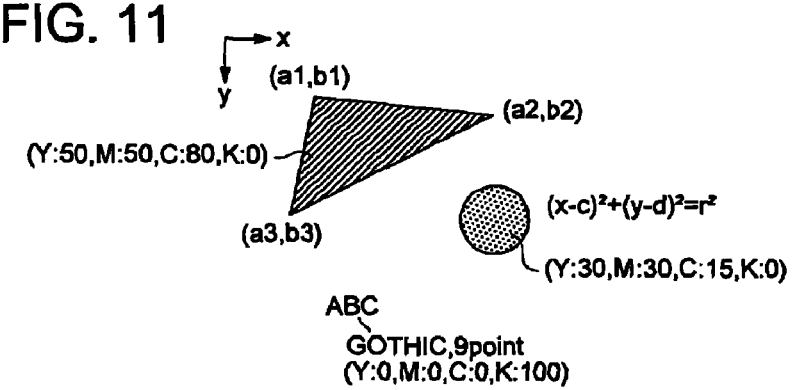
FIG. 11 is an explanatory drawing for explaining vector data.
Figure 12:
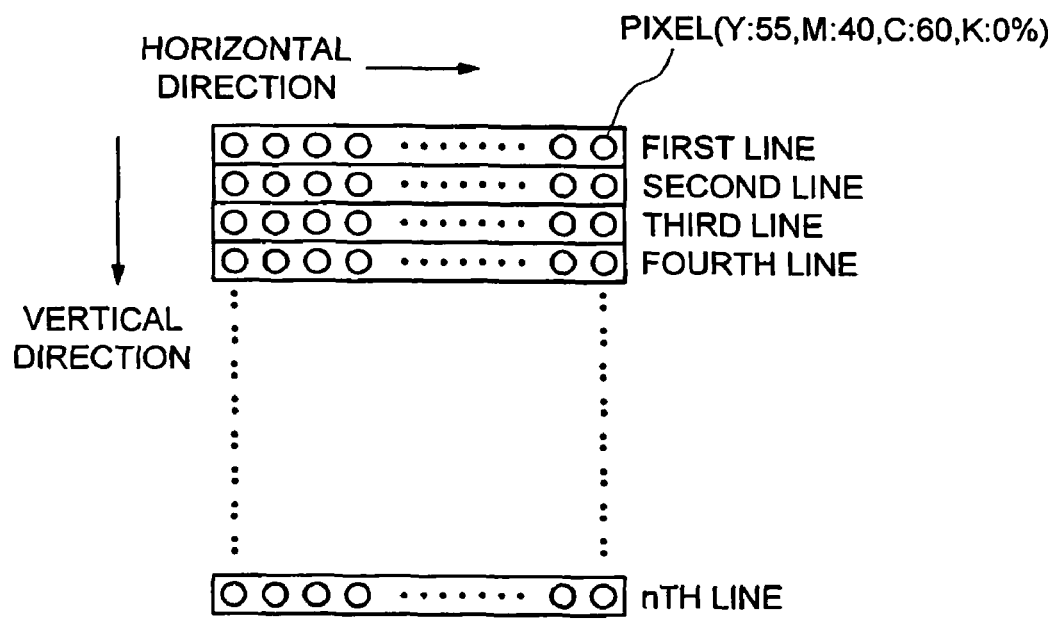
FIG. 12 is an explanatory drawing for explaining raster data.

In the rasterization processing, the image develop processing section 13 analyzes the information of images, character fonts, etc., shown in FIG. 11, to convert them to the raster data for every primary color shown in FIG. 12.

Figure 13:
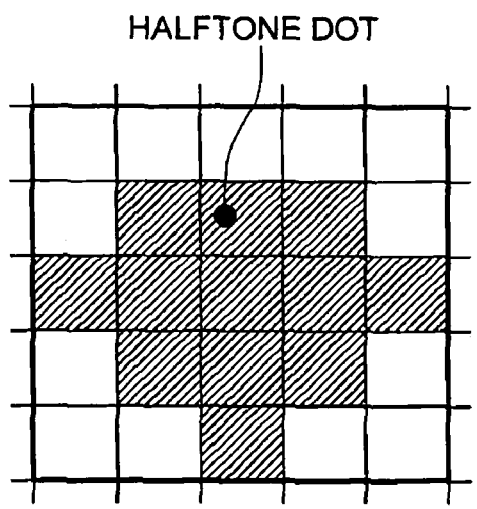
FIG. 13 is an explanatory drawing for explaining halftone dots.

In the halftone dot conversion processing, the image develop processing section 13 converts the raster data for every primary color to halftone dot image data by employing, for instance, the halftone dot fundamental data, so as to express light and shade of the image corresponding to magnitudes of dots residing in the pixel of the predetermined area shown in FIG. 13. Further, a screen, which constitutes the halftone dot as the halftone dot conversion condition indicated as the image forming conditions is provided, and the image develop processing section 13 conducts the halftone dot conversion processing by employing the halftone dot fundamental data corresponding to the screen indicated by the halftone dot conversion condition indicated by the image forming conditions.

Now, an example of the halftone dot conversion processing will be detailed in the following. For instance, as shown in FIG. 4(a), the case, in which the raster data are divided into a plurality of 5×5 pixel areas and, with respect to each area, one dot is expressed in binary, will be detailed in the following. For instance, the halftone dot fundamental data, constituted by a group of threshold values arranged according to a predetermined rule as shown in FIG. 4(c), are employed, so that the magnitude of the dot within the concerned area varies corresponding to the magnitude of the density value of the raster data. Such the halftone dot fundamental data are stored in, for instance, the storage section 12. In FIG. 4(b), a gradation value of each pixel of the 5×5 pixel areas, corresponding to certain raster data shown in FIG. 4(a), is represented in dot-percent. The dot percent of each pixel is compared to the threshold value residing at a corresponding place of the halftone dot fundamental data, so as to determine it as "1" when the dot percent is equal to or greater than the threshold value, while to determine it as "0" when the dot percent is smaller than the threshold value. Then, the raster data shown in FIG. 4(b) are converted to the binary pattern shown in FIG. 4(d). The position of the binary pattern shown in FIG. 4(d) is corresponds to the position of the halftone dot image data shown in FIG. 4(e) on the raster data indicated in FIG. 4(a) of the area indicated in FIG. 4(b). Further, the halftone dot is formed by the pixels of "1" in the 5×5 pixel area as shown in FIG. 4(d). Although an example in which the halftone dot is formed by the pixels represented in binary is described in the foregoing, it is also applicable that the halftone dot conversion processing is conducted by employing a plurality of the halftone dot fundamental data constituted by a group of threshold values arranged according to a predetermined rule, so as to form the halftone dot with the pixels represented by multiple values.

Further, although the description for the abovementioned example is based on the assumption that the elementary data are the vector data, it is also applicable that the elementary data are the raster data. In that case, the halftone dot conversion processing is conducted in such a manner that the color adjustment processing or the layout processing is applied to the raster data, based on the setting information.

<Controlling Configuration of Image Outputting Apparatus>

A receiving section 21 receives the halftone dot image data and the setting information, and then, transmits them to a image output controlling section 23, and store them into a storage section 22.

An image forming section 24 is constituted by a paper feeding section for accommodating recording papers into a plurality of paper feeding trays and selectively feeding recording papers from the plurality of paper feeding trays, a conveyance section for conveying the recording papers fed by the paper feeding section, an image forming section for applying the image forming operation onto the recording papers and an ejecting section for ejecting the recording papers on which images are formed so as to send them into a finisher section 25, (those are not shown in the drawings). Further, each of such the sections is constituted by a motor, parts for sensors, a guiding member for conveying the recording papers, members for supporting them, etc. Incidentally, in the present embodiment, the image forming section 24 forms a color image by overlapping unicolor images of the primary colors with each other. Various kinds of image forming methods, such as an electro-photographic method, a silver-halide method, an ink-jetting method, etc., are applicable for the image forming section 24.

Although the details of the mechanisms are not shown in the drawings, the finisher section 25 is provided with a stapling device for conducting the staple processing, a paper folding device for conducting the folding processing of the recording papers in the case of the middle fold/middle stitch, a mounting device for conducting the mounting processing to mount a cover paper, etc., as processors for conducting the book binding operations of the received recording papers on which images are formed.

The image output controlling section 23 controls the image forming section 24 and the finisher section 25, so as to form the image based on the output conditions included in the setting information and the halftone dot image data and to output the print products.

The output conditions include, for instance, whether or not the proofing should be implemented, a position of image in the recording paper, whether or not the stapling should be applied, settings for the paper folding operation, whether or not the punching should be applied, a number of copies to be outputted, instructions for the paper feeding tray, etc. The image output controlling section 23 controls the image forming section 24 and the finisher section 25 based on the output conditions included in the setting information. However, if the proofing should be implemented, the image output controlling section 23 controls the sections so as to output one copy at first, regardless of the number of copies to be outputted, established in advance (proofing).

Figure 5:
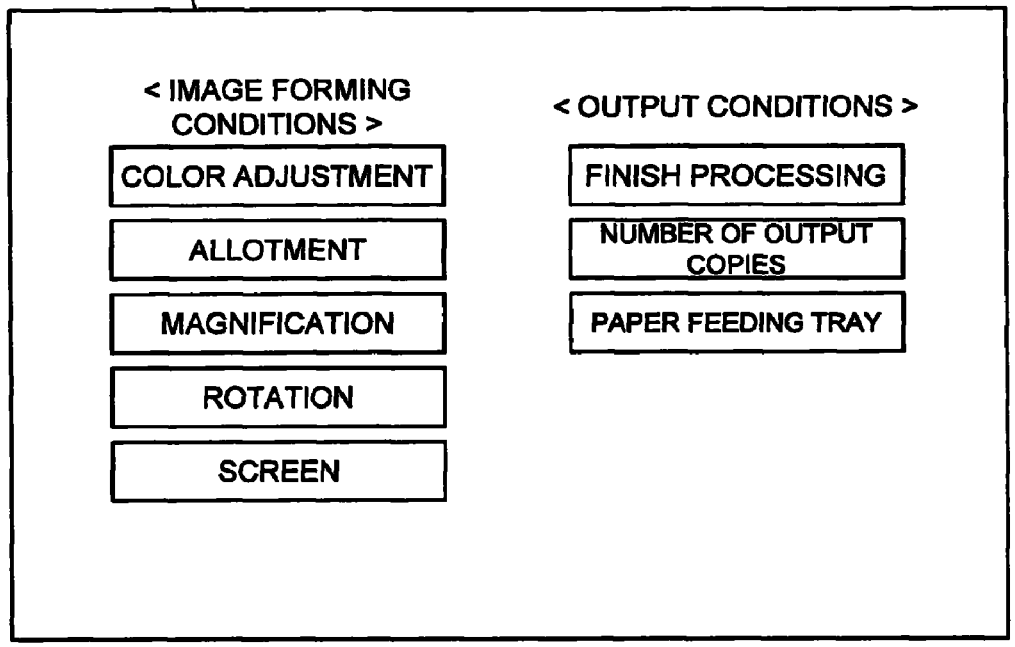
FIG. 5 shows an example of a setting change screen.
Figure 6:
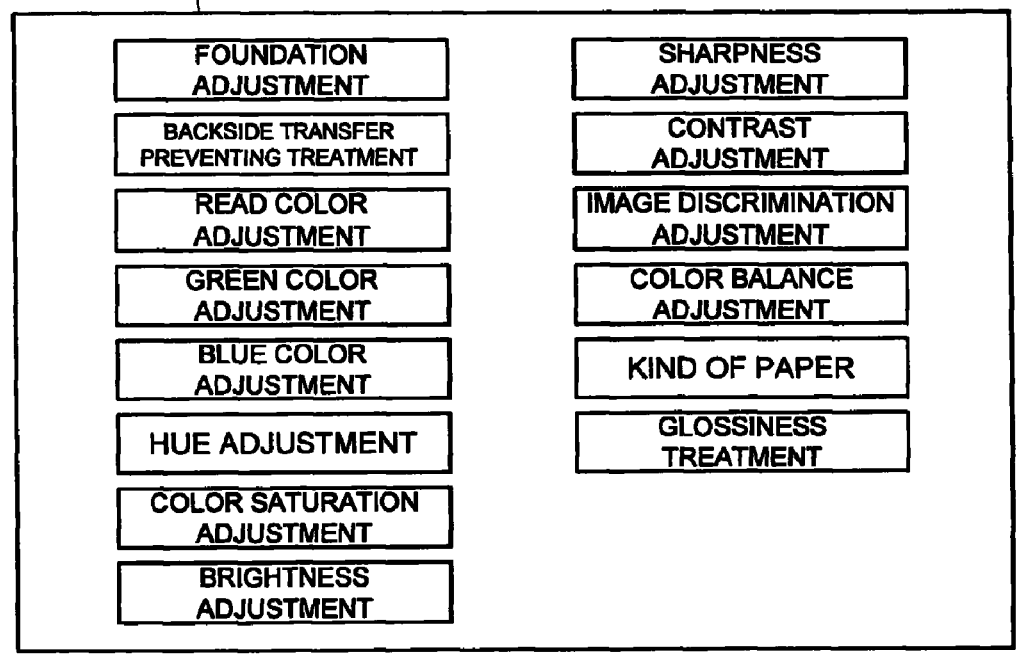
FIG. 6 shows an example of a color adjustment setting screen.
Figure 7:
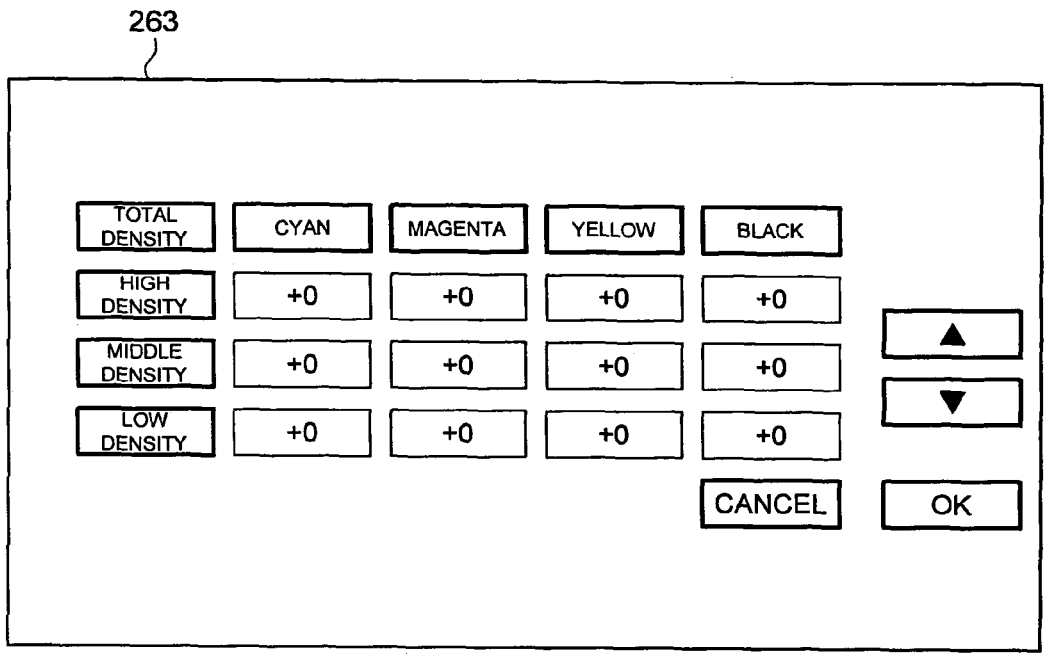
FIG. 7 shows an example of a color balance inputting screen.

Although the details are not shown in the drawings, a inputting section 26 is constituted by various kinds of keys, such as a start key, a stop key, a proof key for activating the proofing, ten keys, etc., and a liquid crystal touch panel, etc. Various kinds of inputting operations can be conducted by using the various kinds of keys, the liquid crystal touch panel, etc., cited in the above. Further, by operating the keys, the liquid crystal touch panel, etc. equipped in the inputting section 26, it is possible to input the instruction of changing the settings of the image forming conditions and the output conditions mentioned in the above. For instance, the abovementioned fact will be detailed by exemplifying the instruction for changing the color balance, which is one of the image forming conditions with respect to the color adjustment aforementioned. At first, by operating the keys, the liquid crystal touch panel, etc., for instance, a setting change screen 261 as shown in FIG. 5 is displayed on the liquid crystal touch panel. As shown in FIG. 5, soft keys with respect to the image forming conditions, such as "COLOR ADJUSTMENT", "ALLOTMENT", "MAGNIFICATION", "ROTATION" and "SCREEN", and soft keys with respect to the output conditions, such as "FINISH PROCESSING", "NUMBER OF OUTPUT COPIES" and "PAPER FEEDING TRAY", are displayed on the setting change screen 261 in a selectable manner. Then, if the soft key of the "COLOR ADJUSTMENT" is touched, for instance, a color adjustment setting screen 262 as shown in FIG. 6 is displayed. As shown in FIG. 6, soft keys, each of which corresponds to each of image forming conditions with respect to the color adjustment, are displayed on the color adjustment setting screen 262. Then, if the soft key of the "COLOR BALANCE" is touched, for instance, a color balance inputting screen 263 as shown in FIG. 7 is displayed, so as to input a desired value of color balance with respect to each of the primary colors. As well as the above, with respect to the other image forming conditions or the other output conditions, the inputting screens are provided, so as to make it possible to input a corresponding value by using each of the inputting screens. Then, when the inputting operations of desired values are completed, the inputting operation can be finalized by pushing down either the start key or the proof key. When the inputting operation is finalized by pushing down the start key, the non-implementation of the proofing is established, while, when the inputting operation is finalized by pushing down the proof key, the implementation of the proofing is established.

A setting change instructing section 27 receives setting change instructions in regard to the image forming conditions and the output conditions through the inputting section 26. When the setting change instructions, inputted from the inputting section 26, include a change of the image forming conditions, namely, a condition with respect to the developing operation to be conducted in the controlling apparatus 1, the setting change instructions are sent to the setting change section 14 of the controlling apparatus 1, while, when the setting change instructions, inputted from the inputting section 26, do not include a change of the image forming conditions, namely, a condition with respect to the developing operation to be conducted in the controlling apparatus 1, the setting change instructions are sent to a setting change section 28 (the second changing section) of the image outputting apparatus 2.

Based on the setting change instructions sent from the setting change instructing section 27, the setting change section 28 rewrites the setting information of the halftone dot image data stored in the storage section 22 and being an object of the setting change operation, and then, sends the rewritten setting information to the image output controlling section 23.

According to the configuration described in the foregoing, it becomes possible for the image outputting apparatus 2 to instruct the change of the image forming conditions.

<Image Outputting Method>

Figure 8:
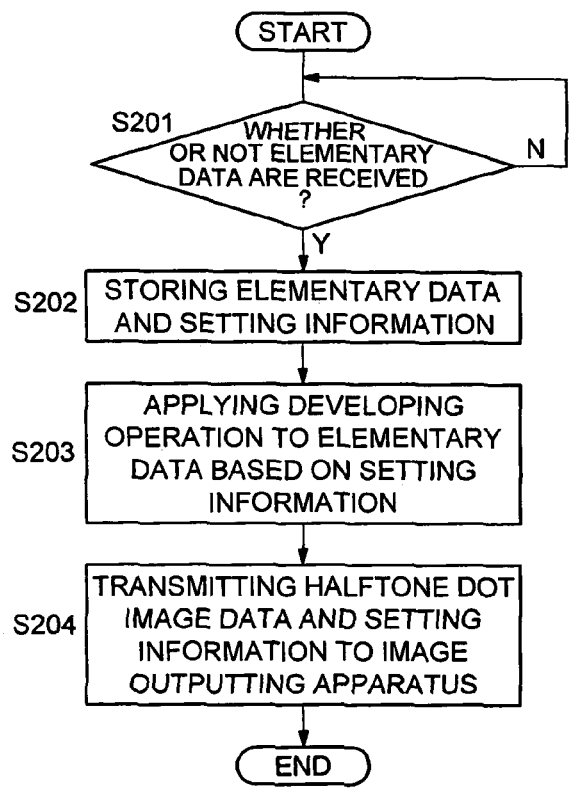
FIG. 8 shows a flowchart of operations to be conducted in a controlling apparatus of an image outputting system embodied in the present invention.
Figure 9:
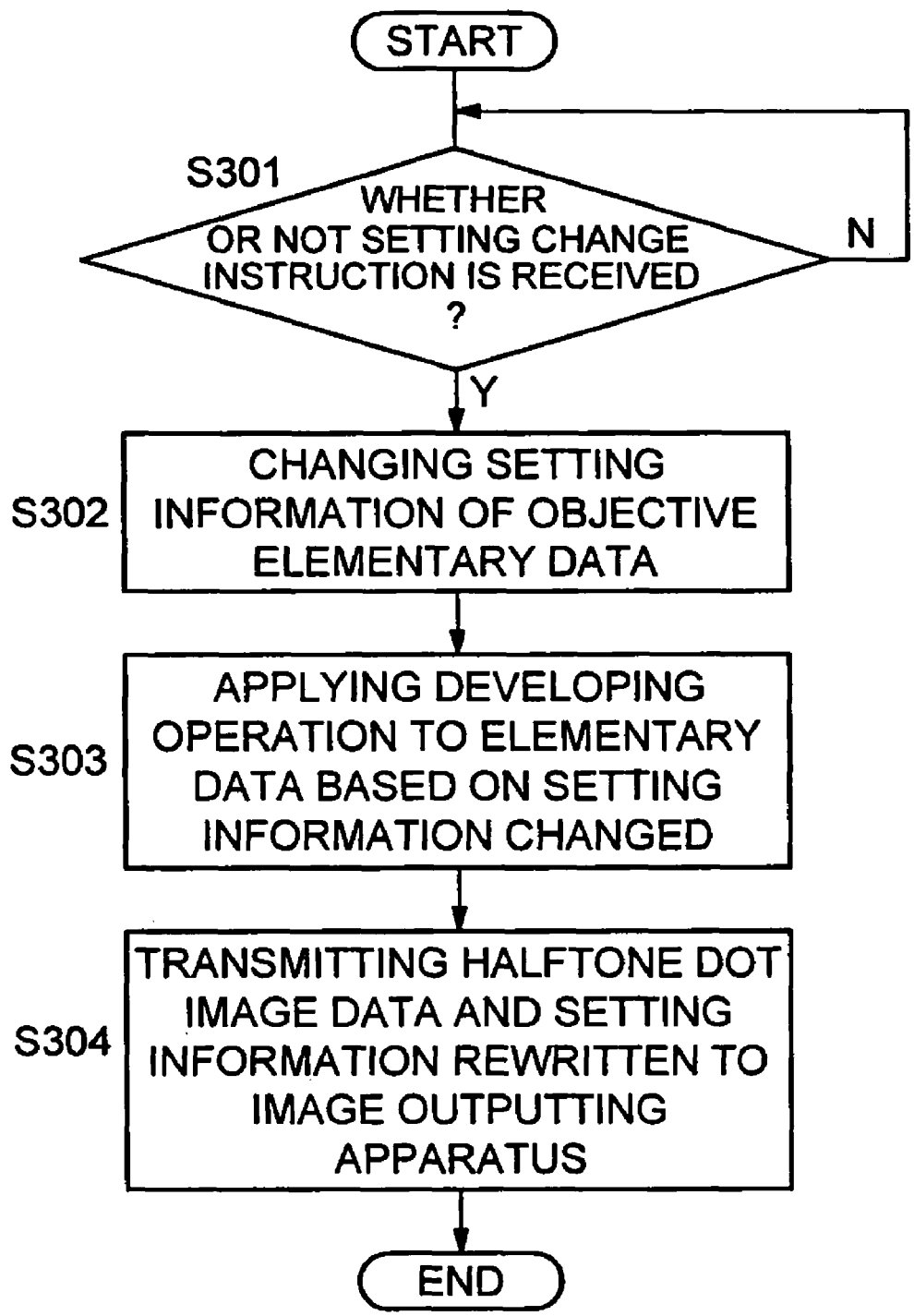
FIG. 9 shows another flowchart of operations to be conducted in a controlling apparatus of an image outputting system embodied in the present invention.
Figure 10:
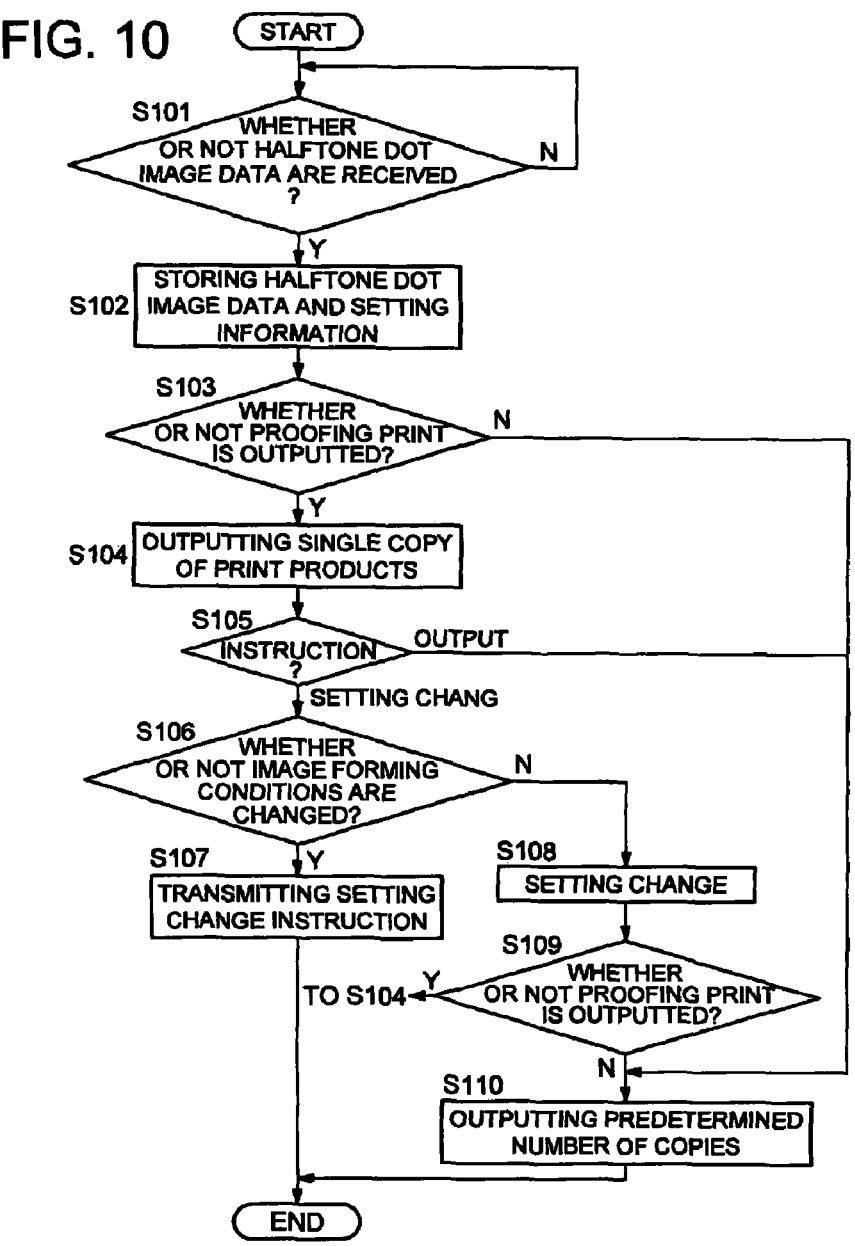
FIG. 10 shows a flowchart of operations to be conducted in an image outputting apparatus of an image outputting system embodied in the present invention.

Next, referring to FIG. 8 through FIG. 10, the image outputting method to be implemented in the image outputting system described in the foregoing will be detailed in the following. FIGS. 8 and 9 show a flowchart of the operations to be conducted in the controlling apparatus 1 of the image outputting system in the present embodiment. FIG. 10 shows a flowchart of the operations to be conducted in the image outputting apparatus 2 of the image outputting system in the present embodiment.

Initially, the operator operates the client terminal 3 so as to create elementary data and to attach setting information to the created elementary data, and then, to send the elementary data attached with the setting information to the controlling apparatus 1 through the network N. As shown in FIG. 8, when the receiving section 11 receives the elementary data and the setting information (Step S201, Y), the elementary data and the setting information are stored in the storage section 12 (Step S202).

On the other hand, the elementary data and the setting information received by the receiving section 11 are sent to the image develop processing section 13, in which the color adjustment processing and the layout processing are applied to the elementary data on the basis of the setting information. Further, the elementary data are rasterized, and then, the rasterized image data are converted to the halftone dot image data as the developing operation of the elementary data (Step S203). Then, the halftone dot image data and the setting information are transmitted to the image outputting apparatus 2 (Step S204).

Next, as shown in FIG. 10, when the image outputting apparatus 2 receives the halftone dot image data and the setting information (Step S101, Y), the halftone dot image data and the setting information are stored in the storage section 22 (Step S102).

On the other hand, the elementary data and the setting information received by the image outputting apparatus 2 are sent to the image output controlling section 23. If the implementation command of the proofing is not included in the setting information (Step S103, N), the image output controlling section 23 controls the image forming section 24 and the finisher section 25, so as to output print products, a number of which is equal to that established in the setting information, in an output-mode established in the setting information (Step S110). If the implementation command of the proofing is included in the setting information (Step S103, Y), the image output controlling section 23 controls the image forming section 24 and the finisher section 25, so as to output a single copy of print products in an output mode established in the setting information (Step S104).

When the operator confirms the single copy outputted in the above, and then, inputs a output command of them (Step S105, OUTPUT), the image output controlling section 23 controls the image forming section 24 and the finisher section 25, so as to output print products, a number of which is equal to that established in the setting information, in an output mode established in the setting information (Step Silo).

When the setting change instruction is inputted (Step S105, SETTING CHANGE), and the change instruction of the image forming conditions is also inputted (Step S106, Y), the setting change instructing section 27 sends a setting change instruction to the controlling apparatus 1 (Step S107). When the change. instruction of the image forming conditions is not inputted (Step S106, N), the setting change instructing section 27 sends a setting change instruction to the setting change section 28. Then, the setting change section 28 rewrites the setting information of the halftone dot image data stored in the storage section 22 and being an object of the setting change operation (Step S108), and then, sends the rewritten setting information to the image output controlling section 23. At this time, if the input operation of the setting change instruction by means of the inputting section 26 is completed by the pushdown operation of the proof key, the implementation command of the proofing is established in the setting information, while, if the input operation is completed by the pushdown operation of the start key, the implementation command of the proofing is not established in the setting information. Then, if the implementation command of the proofing is not established in the setting information (Step S109, N), the image output controlling section 23 controls the image forming section 24 and the finisher section 25, so as to output print products, a number of which is equal to that rewritten by the setting change section 28, in an output mode established in the setting information rewritten by the setting change section 28 (Step S101), while, if the implementation command of the proofing is established in the setting information (Step S109, N), the image output controlling section 23 controls the image forming section 24 and the finisher section 25, so as to output a single copy of print products in an output mode established in the setting information rewritten by the setting change section 28 (Step S104). Then, the Steps from S105 to S107 are repeated.

Further, the setting change instruction is also sent to the controlling apparatus 1. As shown in FIG. 9, when the setting change section 14 receives the setting change instruction (Step S301, Y), the setting change section 14 rewrites the setting information of the elementary data stored in the storage section 12 and being an object of the setting change operation, based on the setting change instruction (Step S302), and then, sends the rewritten setting information to the image develop processing section 13. At this time, if the input operation of the setting change instruction by means of the inputting section 26 is completed by the pushdown operation of the proof key, the implementation command of the proofing is established in the setting information, while, if the input operation is completed by the pushdown operation of the start key, the implementation command of the proofing is not established in the setting information.

Based on the setting information rewritten, the image develop processing section 13 applies the color adjustment processing, the layout processing and the rasterizing processing to the elementary data, and then, converts the tasterized image data to the halftone dot image data as the developing operation of the elementary data (Step S303). Then, the halftone dot image data and the setting information rewritten are transmitted to the image outputting apparatus 2 (Step S304).

Further, the Steps from S101 shown in FIG. 10 are repeated in the image outputting apparatus 2.

Still further, although the case in which the image forming conditions are changed after the proofing is completed has been exemplified in the foregoing, the case, in which the setting information of the halftone dot image data stored in the storage section 22 are to be changed, is also applicable.

As aforementioned, according to the image outputting system embodied in the present invention, it becomes possible to instruct the change of the image forming conditions in the image outputting apparatus 2, so as to easily output the print products corresponding to the change of the image forming conditions.

According to the image outputting system embodied in the present invention, by conducting the instructing operation of the change of the setting information with respect to the developing operation by means of the image outputting apparatus, it is possible to conduct the developing operation for converting the first-type image data to the second-type image data in the controlling apparatus, based on the instruction of the change, and to resend the second-type image data back to the image outputting apparatus. Accordingly, it becomes possible to easily obtain the print products for which the setting information with respect to the developing operation is changed.

While the preferred embodiments of the present invention have been described using specific term, such description is for illustrative purpose only, and it is to be understood that changes and variations may be made without departing from the spirit and scope of the appended claims.

What is claimed is:

1. An image outputting system, comprising:
a controlling apparatus that receives first-type image data and setting information attached to said first-type image data; and
an image outputting apparatus that is coupled to said controlling apparatus so that said controlling apparatus and said image outputting apparatus can communicate with each other through a network;
wherein said controlling apparatus comprises a converting unit to conduct an image-data conversion processing for converting said first-type image data to second-type image data that is processable by said image outputting apparatus, and to send said second-type image data and said setting information to said image outputting apparatus;
wherein said image outputting apparatus comprises: (i) an image outputting unit to output print products based on said second-type image data and said setting information received from said controlling apparatus, (ii) an inputting unit to input a change instruction with respect to said print products, and (iii) a setting-change instructing unit to transmit said change instruction to said controlling apparatus, when said change instruction inputted from said inputting unit includes a change with respect to said image-data conversion processing conducted in said controlling apparatus;
wherein said controlling apparatus further comprises a first changing unit to rewrite said setting information attached to said first-type image data being an object of said change instruction, based on said change instruction upon receiving said change instruction, and said converting unit converts said first-type image data being the object of said change instruction, to said second-type image data, based on current setting information rewritten by said first changing unit, and sends said second-type image data and said current setting information to said image outputting apparatus; and
wherein said image outputting apparatus further comprises a second changing unit to rewrite said setting information, based on said change instruction, when said change instruction inputted from said inputting unit does not include a change with respect to said image-data conversion processing conducted in said controlling apparatus, and said image outputting unit of said image outputting apparatus outputs print products based on current setting information rewritten by said second changing unit.

2. The image outputting system of claim 1, further comprising a terminal device that outputs said first-type image data and said setting information, wherein the controlling apparatus is coupled with the terminal device through the network.

3. The image outputting system of claim 1, wherein said first-type image data comprises one of vector data and raster data, and said second-type image data comprises halftone dot image data; and
wherein said change instruction including a change with respect to said image-data conversion processing conducted in said controlling apparatus includes at least one of change items of a change of a color adjusting condition, a change of a layout condition, and a change of a halftone dot converting condition, so that said first changing unit conducts a rewriting operation, based on said change instruction that includes at least one of said change items.

4. An image outputting system, comprising:
a controlling apparatus that receives first-type image data and setting information attached to said first-type image data; and
an image outputting apparatus that is coupled to said controlling apparatus so that said controlling apparatus and said image outputting apparatus can communicate with each other through a network;
wherein said controlling apparatus comprises a converting unit to conduct an image-data conversion processing for converting said first-type image data to second-type image data that is processable by said image outputting apparatus, and to send said second-type image data and said setting information to said image outputting apparatus;

wherein said image outputting apparatus comprises: (i) an image outputting unit to output print products based on said second-type image data and said setting information received from said controlling apparatus, (ii) a controlling unit to control said image outputting unit so as to conduct a proof printing based on said second-type image data when an instruction for implementing a proofing is included in said setting information, (iii) an inputting unit to input a change instruction with respect to said print products, and (iv) a setting-change instructing unit to transmit said change instruction to said controlling apparatus, when an instruction for changing said setting information with respect to said proofing is inputted from said inputting unit and when said change instruction inputted from said inputting unit includes a change with respect to said image-data conversion processing conducted in said controlling apparatus;

wherein said controlling apparatus further comprises a first changing unit to rewrite said setting information attached to said first-type image data being an object of said change instruction, based on said change instruction upon receiving said change instruction, and said converting unit converts said first-type image data being the object of said change instruction, to said second-type image data, based on current setting information rewritten by said first changing unit, and sends said second-type image data and said current setting information to said image outputting apparatus; and wherein said image outputting apparatus further comprises a second changing unit to rewrite said setting information, based on said change instruction, when said change instruction inputted from said inputting unit does not include a change with respect to said image-data conversion processing conducted in said controlling apparatus, and said image outputting unit of said image outputting apparatus outputs print products based on current setting information rewritten by said second changing unit.

5. The image outputting system of claim 4, further comprising a terminal device that outputs said first-type image data and said setting information, wherein the controlling apparatus is coupled with the terminal device through the network.

6. The image outputting system of claim 4, wherein said first-type image data comprises one of vector data and raster data, and said second-type image data comprises halftone dot image data; and wherein said change instruction includes a change with respect to said image-data conversion processing conducted in said controlling apparatus includes at least one of change items of a change of a color adjusting condition, a change of a layout condition, and a change of a halftone dot converting condition, so that said first changing unit conducts a rewriting operation, based on said change instruction that includes at least one of said change items.

* * * * *